United States Patent
Prankl (10) Patent No.: US 10,694,656 B2
(45) Date of Patent: Jun. 30, 2020

(54) METHOD FOR DETECTING AGRICULTURAL FIELD WORK PERFORMED BY A VEHICLE

(71) Applicant: FARMDOK GMBH, Wieselburg (AT)

(72) Inventor: Johann Prankl, Wieselburg (AT)

(73) Assignee: FARMDOK GMBH, Wieselburg (AT)

( * ) Notice: Subject to any disclaimer, the term of this patent is extended or adjusted under 35 U.S.C. 154(b) by 93 days.

(21) Appl. No.: 16/095,733

(22) PCT Filed: Mar. 29, 2017

(86) PCT No.: PCT/AT2017/060079
§ 371 (c)(1),
(2) Date: Oct. 23, 2018

(87) PCT Pub. No.: WO2017/185114
PCT Pub. Date: Nov. 2, 2017

(65) Prior Publication Data
US 2019/0343036 A1    Nov. 14, 2019

(30) Foreign Application Priority Data
Apr. 27, 2016  (AT) .............................. A 50371/2016

(51) Int. Cl.
*A01B 79/00* (2006.01)
*G01S 19/14* (2010.01)
(Continued)

(52) U.S. Cl.
CPC ............ *A01B 79/005* (2013.01); *G01S 19/14* (2013.01); *G01S 19/53* (2013.01); *G07C 5/008* (2013.01)

(58) Field of Classification Search
None
See application file for complete search history.

(56) References Cited

U.S. PATENT DOCUMENTS

| 6,141,609 A | 10/2000 | Herdeg et al. |
| 7,113,127 B1 * | 9/2006 | Banet .................. B60R 25/102 |
| | | 342/357.31 |

(Continued)

FOREIGN PATENT DOCUMENTS

| DE | 4338556 A1 | 11/1993 |
| EP | 3009990 A1 | 4/2016 |
| WO | 2011085430 A1 | 7/2011 |

OTHER PUBLICATIONS

English Translation of International Preliminary Report on Patentability in corresponding International Application No. PCT/AT2017/060079.

(Continued)

*Primary Examiner* — Richard M Camby
(74) *Attorney, Agent, or Firm* — Hoffmann and Baron, LLP (57) ABSTRACT

The disclosed subject matter relates to a method for detecting agricultural field work performed by a vehicle, comprising:
  a) carrying a satellite navigation receiver on the vehicle and recording a sequence of position fixes and associated time stamps;
  b) for a position fix: determining a group of position fixes that lie in a region;
  c) dividing the group into sub-groups on the basis of a minimum time interval;
  d) determining trajectory sections on the basis of the sub-groups;
  e) determining an attribute vector for the considered position fix comprising at least an angle between two trajectory sections; and, (Continued)

f) if the attribute vector satisfies a specified threshold criterion, detecting the position fix as a location of field work.

12 Claims, 4 Drawing Sheets

(51) Int. Cl.
*G01S 19/53* (2010.01)
*G07C 5/00* (2006.01)

(56) References Cited

U.S. PATENT DOCUMENTS

| | | |
|---|---|---|
| 2005/0256640 A1 | 11/2005 | Sigurdsson et al. |
| 2007/0064525 A1* | 3/2007 | Sanders ................ G01S 13/767 367/4 |
| 2007/0225912 A1* | 9/2007 | Grush .................... G01C 21/20 701/469 |
| 2007/0271014 A1* | 11/2007 | Breed ...................... B60J 10/00 701/31.9 |
| 2008/0249692 A1 | 10/2008 | Dix |
| 2009/0118904 A1 | 5/2009 | Birnie |
| 2011/0054729 A1 | 3/2011 | Whitehead et al. |
| 2012/0109520 A1 | 5/2012 | Hood et al. |

OTHER PUBLICATIONS

Austrian Office Action dated Mar. 1, 2017.
International Search Report dated Jul. 17, 2017.

\* cited by examiner

METHOD FOR DETECTING AGRICULTURAL FIELD WORK PERFORMED BY A VEHICLE

CROSS-REFERENCE TO RELATED APPLICATIONS

This application is a National Phase application of International Application No. PCT/AT2017/060079 filed Mar. 29, 2017 which claims priority to Austrian Patent Application No. A 50371/2016 filed Apr. 27, 2016, the disclosures of which are incorporated herein by reference.

TECHNICAL FIELD

The present disclosed subject matter relates to a method for detecting agricultural field work performed by a vehicle. The disclosed subject matter also relates to a method for classifying the detected field work and for automatically measuring agriculturally worked fields.

BACKGROUND

The automatic detection, classification and measurement of field work is of great help to farmers, not only for the automatic creation of compulsory documentation of their work for economical purposes and environmental protection, but in particular also for monitoring the work previously performed on the field and for planning future field works to be performed, whether ploughing, tilling, harrowing, preparation of seedbeds, cultivation, fertilisation, crop protection, cutting, turning, swathing, harvesting, etc. For this purpose, it is known to equip agricultural vehicles such as tractors, combine harvesters, etc. with satellite navigation receivers which record the path (trajectory) of the vehicle over the field so as to create the desired documentation and measurements on this basis. For distinction between actual work in the field and mere journeys to and from the field, digital maps are usually used, on which the fields are registered so as to assign the position specifications (position fixes) of the satellite navigation receiver to a field registered in the map.

BRIEF SUMMARY

The objective of the disclosed subject matter is to create a method for the automatic detection of field work which spares the use of digital maps and is also able to detect fields previously unregistered on the basis of the performed field work and to classify and measure these subsequently.

This objective is achieved in accordance with a first aspect of the disclosed subject matter by means of a method for detecting agricultural field work performed by a vehicle, comprising:

a) carrying a satellite navigation receiver on the vehicle and recording a sequence of position fixes and associated time stamps of the satellite navigation receiver;

b) for a position fix of the sequence: determining a group of position fixes that lie in a predefined local region around the considered position fix;

c) dividing the group into at least two sub-groups, of which position fixes of the first sub-group have a minimum time interval from position fixes of the second sub-group;

d) determining a first trajectory section on the basis of at least two position fixes of the first sub-group and a second trajectory section on the basis of at least two position fixes of the second sub-group;

e) determining an attribute vector for the considered position fix comprising at least an angle between the first and the second trajectory section; and, f) if the attribute vector satisfies a specified threshold criterion comprising a maximum angle, detecting the position fix as a location of field work.

In accordance with the disclosed subject matter, parallel travel patterns in the local surroundings of a position fix are thus detected so as to either detect this, or not, as a location at which field work is performed. The latter case for example indicates transportation or road journeys when travelling to or from a field. The detection according to the disclosed subject matter of field work also makes it possible to identify field work in new fields worked for the first time, without these fields having to be already registered in a digital map.

The method of the disclosed subject matter can be carried out for example with a conventional smartphone which is equipped with the satellite navigation receiver and which records the sequence of position fixes (the "track") and evaluates this in the aforesaid manner.

Alternatively, however, only step a) can be carried out with a mobile terminal, for example a smartphone, and steps b) to f) can be carried out in a remote server which obtains the track recorded by the terminal from the terminal for example via a mobile communication connection and evaluates it with a high server computing power.

A further embodiment of the disclosed subject matter is is characterised in that when the considered position fix is part of the first sub-group the attribute vector comprises a normal distance of the considered position fix from the closest second trajectory section, and the threshold criterion also comprises a maximum distance. By incorporating the distance between the trajectory sections in the surroundings of the examined location, the reliability of the detection of field work can be increased further still. This is based on the knowledge that the distance between parallel travel patterns on a field is determined generally by the working width of the field working vehicle, for example the plough width of a tractor, the cutting width of a combine harvester, etc. A position fix is thus identified in this embodiment as belonging to field work if both sufficient parallelism (undershooting of the maximum angle) and a distance from the neighbouring trajectories realistic for field work (undershooting of the maximum distance) are present.

On the basis of the normal distance of a position fix from its neighbouring trajectory section, the type of field work performed there can also be determined in accordance with a further feature of the of the disclosed subject matter, i.e. the field work can be classified. For example, a large working width of the vehicle and therefore a large normal distance are typical for field work such as crop protection or fertilisation, whereas a small working width and therefore a small normal distance are typical for high-force field work, such as ploughing or tilling.

In a further advantageous embodiment of the disclosed subject matter —if the considered position fix is part of the first sub-group—the attribute vector can comprise a speed determined from at least two position fixes and associated timestamps of the first sub-group and the threshold criterion can also comprise a maximum speed. The overshooting or undershooting of the maximum speed can thus be a further distinguishing feature for the detection of field work, which is incorporated in the threshold criterion. Generally, a higher speed is thus selected when travelling to and from a field, i.e. in the case of road journeys or during transport, than when performing field work.

The speed determined in this way can then be used in conjunction with the normal distance and thus the working width of the vehicle for improved classification of the detected field work. If, for example, both the working width and conventional travel speed of a plough, a harrow, a fertiliser spreader, or the like are known, the field work can be classified accordingly as ploughing, harrowing, fertilising, etc. on the basis of the determined normal distance and the determined speed.

In accordance with a further aspect of the disclosed subject matter the method comprises:

carrying out steps b) to f) for each position fix in the sequence; and identifying a plurality of locally contiguously adjacent position fixes, each detected as the location of field work, as an agriculturally worked field.

In this way, not only can individual locations of field work be detected, but also entire fields. For example, the area of the identified field can then be calculated on this basis so as to monitor and plan agricultural activities, for example the procurement and spreading of fertilisers by area, the calculation of area-based revenue generated by the field, etc.

The working width of the vehicle can also be averaged here from a number of normal distances determined during the course of the detection of the field.

An improved determination of the working width comprises the optional following method steps:

dividing the position fixes in the field into chronologically successive runs of alternating direction of travel;

smoothing the position fixes in the field so as to maximise the parallelism of the journeys; and determining a working width from the mutual distance between at least two journeys.

In this way, the expected parallelism of the journeys in the field is used to remedy measurement errors of the satellite navigation determination, which results in improved accuracy of the method.

The determined working width can then be used to improve the measurement of the area of the field. A further embodiment of the method comprises, accordingly:

determining a contour of the field;

increasing the contour of the field by a proportion, for example by half, of the working width; and calculating the area within the increased contour as area of the identified field.

The improvement is based on the assumption that the satellite navigation receiver, for example a smartphone, is carried by the driver of the vehicle for example in the centre of the vehicle, such that the effective working width of the vehicle projects therefrom to the left and right. Even if the driver's cab is not arranged centrally, this can be taken into consideration by adding an appropriate proportion of the working width to the contour, more specifically depending on whether the driver's cab is excentric to the left or right in the direction of travel of the vehicle.

The working width determined by averaging over the entire field or from a smoothing of the position fixes can be used in turn for classification of the field work, for example also in conjunction with an evaluation of the speed of travel as described above.

BRIEF DESCRIPTION OF THE DRAWINGS

The disclosed subject matter will be explained in greater detail hereinafter on the basis of exemplary embodiments shown in the accompanying drawings, in which.

DETAILED DESCRIPTION

Figure 1:
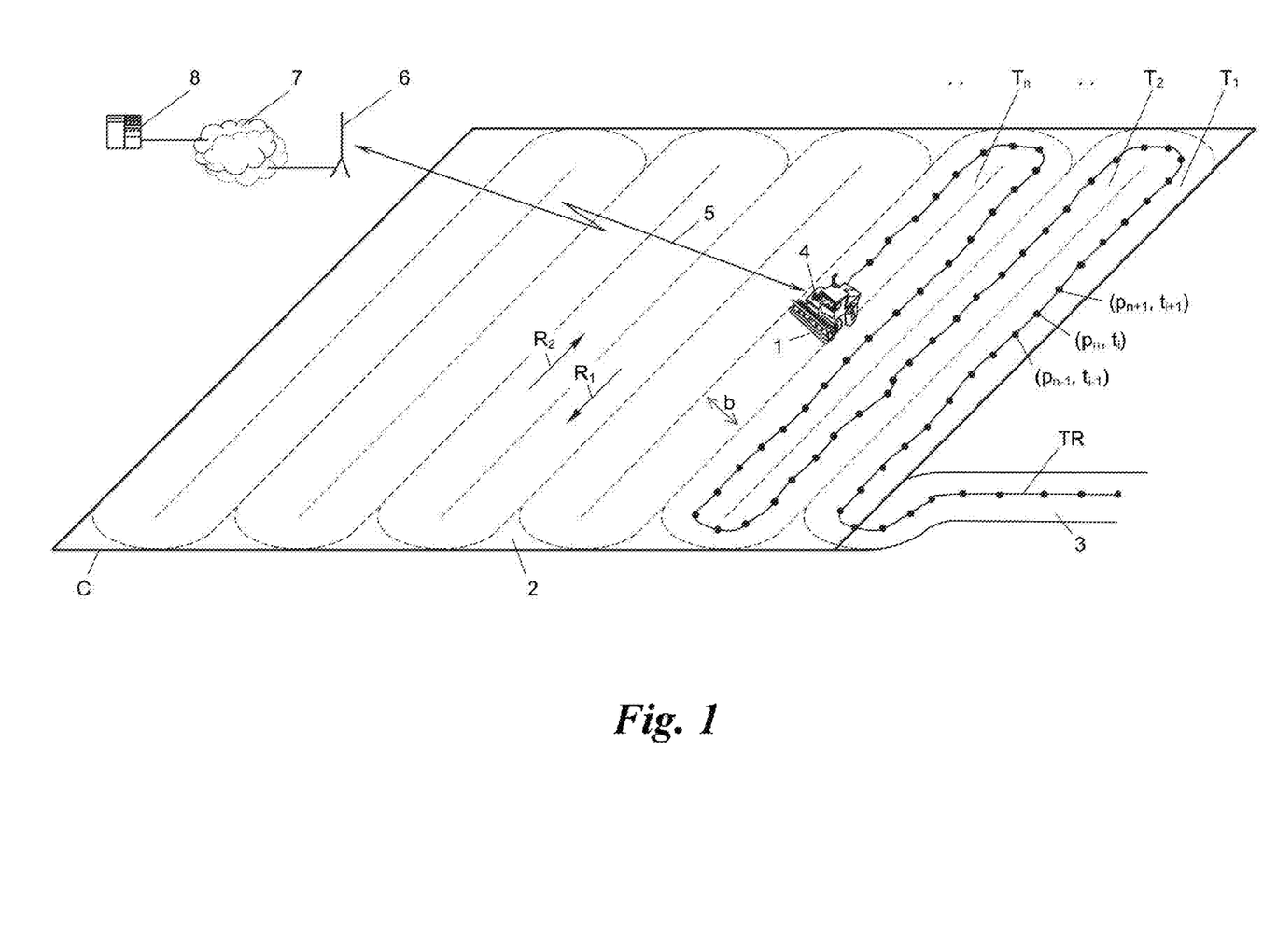
FIG. 1 shows the agricultural working of a field in conjunction with components of the method according to the disclosed subject matter in a schematic perspective view.

FIG. 1 shows an agricultural vehicle 1, for example a tractor, combine harvester, or the like, which is performing agricultural field work on a field 2. The field work can be of any known type, for example soil working or seedbed working, such as ploughing, tilling, harrowing, etc., sowing of seed, fertilising or crop protection, cutting, turning or swathing, harvesting, etc. The field 2 is travelled over here in chronologically successive runs $T_1, T_2, \ldots$, generally $T_n$, with alternating direction of travel $R_1$ or $R_2$, which on the whole results in an approximately snaking or meandering trajectory TR of the vehicle 1 over the field 2. The vehicle 1 travels to and from the field 2 over a track or a road, generally a road network 3.

The vehicle 1 carries a satellite navigation receiver 4, which measures the geoposition of said vehicle continuously, for example a number of times per second or every few seconds, and records this in the form of position fixes $p_1$, $p_2, \ldots$, generally p with an associated timestamp $t_1$, $t_2, \ldots$, generally $t_i$. The sequence FG=$\{(p_i,t_i)\}$ of pairs of position fixes $p_i$ and timestamps $t_i$ thus characterises the entire trajectory TR of the vehicle 1, including its journeys over the field 2 and the road network 3.

The satellite navigation receiver 4 for example can be part of a mobile terminal, for example a mobile telephone or smartphone belonging to the driver of the vehicle 1, and can be carried by the vehicle driver; alternatively, however, the satellite navigation receiver 4 could also be installed permanently in the vehicle 1.

The sequence FG (the "track" of the trajectory TR) can be evaluated directly in the satellite navigation receiver 4 in the manner described hereinafter, for example in a smartphone belonging to the vehicle driver and equipped with the satellite navigation receiver 4. The recorded sequence FG can be sent for evaluation to a remote server 8 via a mobile communication connection 5, a mobile communication network 6, and a data network 7, for example the Internet. The sequence FG can be transmitted continuously or in portions or also only when initiated by an accordingly programmed application in the satellite navigation receiver 4, when initiated by the vehicle driver, or when initiated by a user of the server 8.

Figure 2:
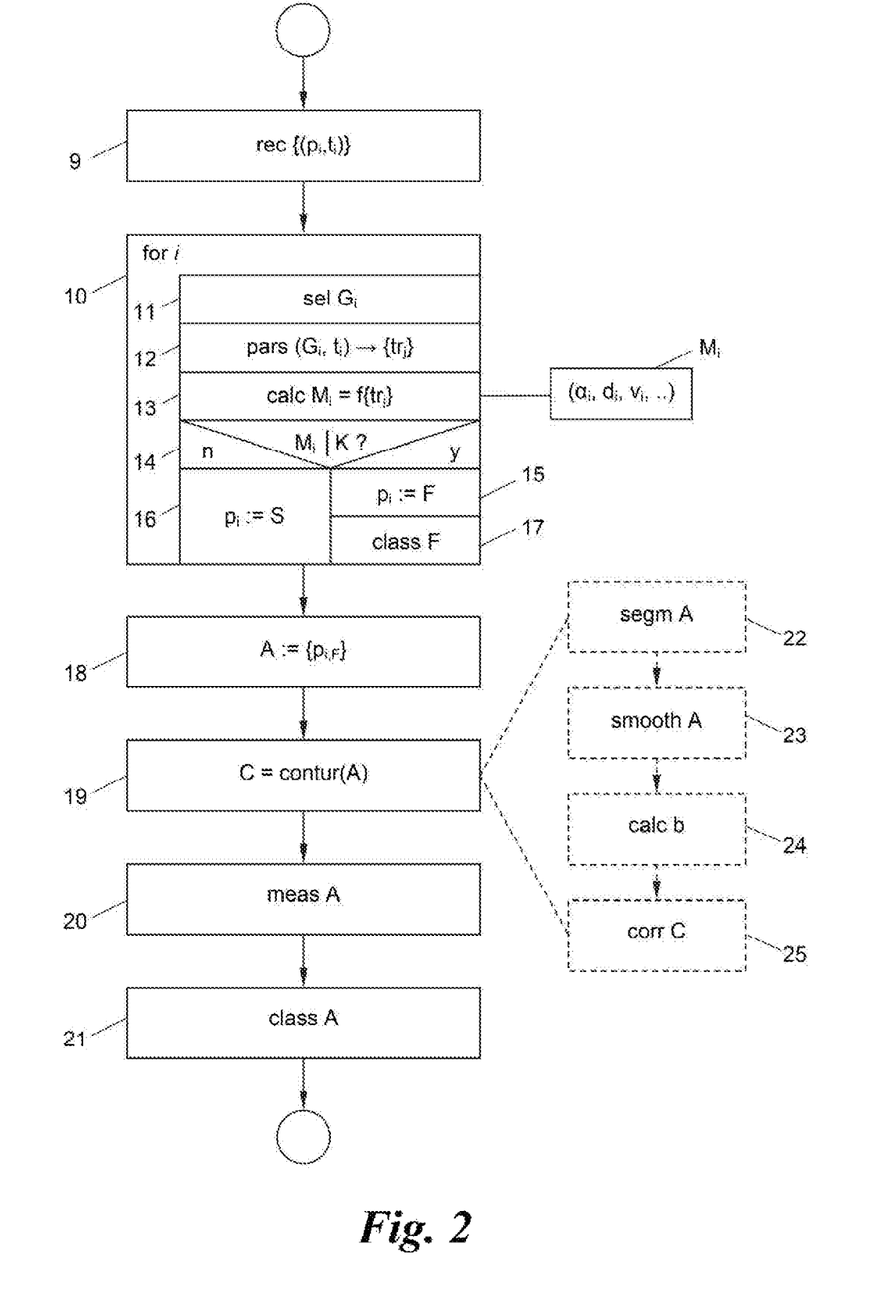
FIG. 2 shows a flow diagram of the method of the disclosed subject matter.
Figure 3:
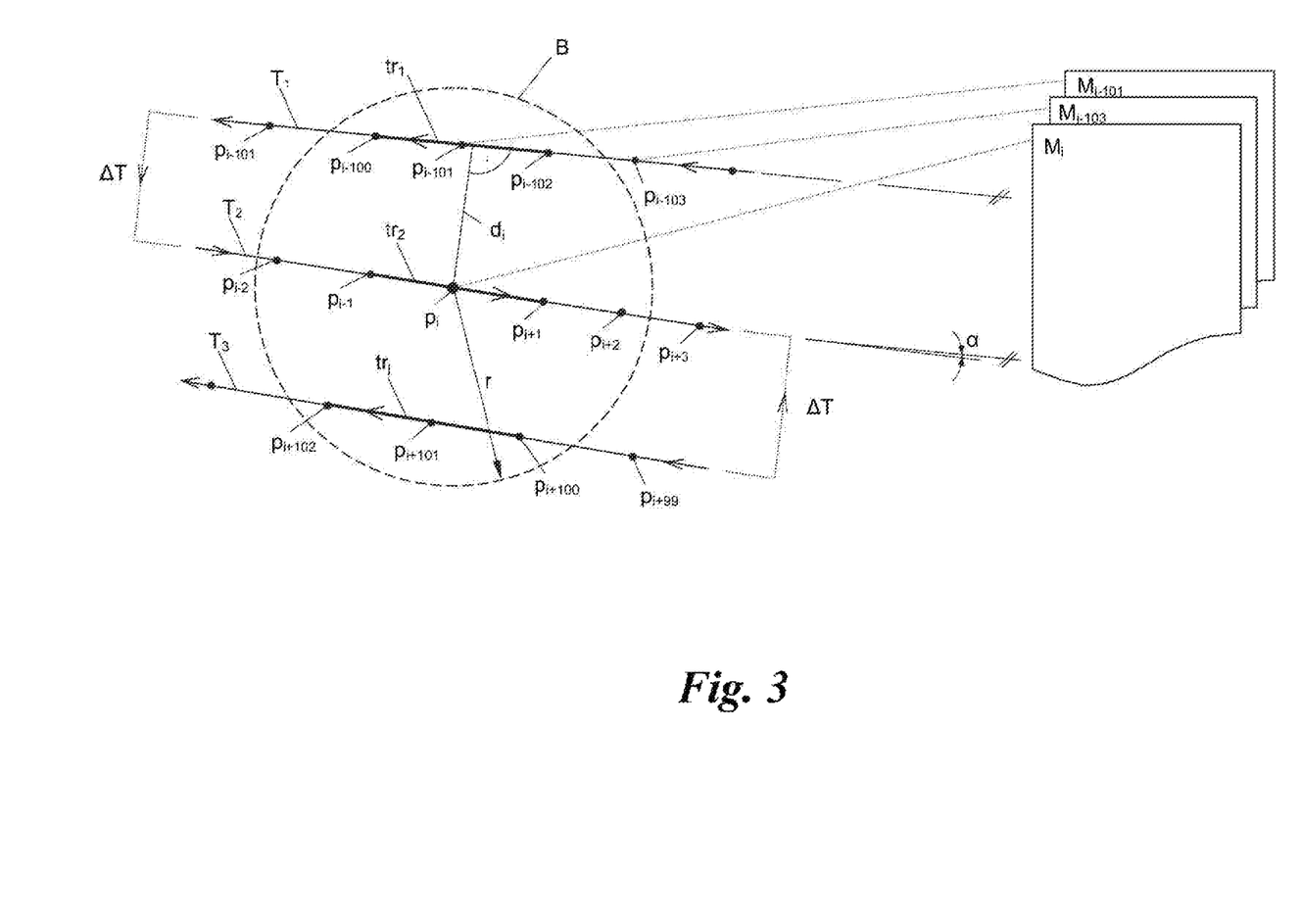
FIG. 3 shows the local surroundings of one of the position fixes on the field from FIG. 1 in a schematic plan view with further components of the method of the disclosed subject matter.

Referring simultaneously to FIGS. 2 and 3, a method performed with the aid of the satellite navigation receiver 4 and/or the server 8 for evaluating the sequence FG will now be described, which method automatically detects whether the vehicle 1 is currently performing field work, or not. The presence of a field 2 in the landscape can then be identified on the basis of the detection of field work, and said field can also be measured. Lastly, it will be described how the type of field work on the field 2 being performed by the vehicle 1 can be classified automatically, so as to serve for purposes of agricultural documentation, monitoring and planning.

According to FIG. 2 the sequence FG is recorded as just described in a first step 9. In a loop 10, each position fix $p_i$ in the sequence FG is then examined to ascertain whether this is a location at which field work is being performed, or not.

To this end, in the first sub-step 12 of the loop 10 according to FIG. 3, a local region B is drawn around the particular position fix $p_i$ under consideration in the sequence FG. The region B can have any shape, for example the shape of a square, rectangle, an ellipse, or a circle. The size of the region B, for example in the case of a circular region of radius r, is preferably selected here to be greater than the maximum expected working width b of the vehicle 1.

All position fixes $p_i$ in the sequence FG which lie in the region B form a group $G_i$ of position fixes, in the present example the group $G_i\{p_{i-102}, p_{i-101}, p_{i-100}, p_{i-2}, p_{i-1}, p_i, p_{i+1}, p_{i+2}, p_{i+100}, p_{1+101}, p_{1+102}\}$.

In the next sub-step 12 the group $G_i$ is now divided ("parsing") with use of the timestamps $t_i$ of the position fixes $p_i$ contained therein into (at least) two sub-groups, here the three sub-groups $\{p_{i-102}, p_{i-101}, \text{pi}-100\}$, $\{p_{i-2}, p_{i-1}, p_i, p_{i+1}, p_{i+2}\}$ and $\{p_{i+100}, p_{i-101}, p_{i+102}\}$, wherein the division criterion lies in the fact that the time interval $t_{i+1}-t_i$ between two chronologically successive position fixes $p_{i+1}$ and $p_i$ exceeds a predefined minimum time interval $\Delta T$. In other words, all position fixes within a sub-group differ by at least the time interval $\Delta T$ from all position fixes in another sub-group. A minimum time interval can optionally also be checked, i.e. position fixes that have too great a time interval from the considered position fix $p_i$ are separated and no longer taken into consideration.

This division of the sequence FG and thus of the trajectory TR is based on the assumption that in the region B the position fixes $p_i$ from neighbouring runs $T_{n\pm1}$ on the field 2 each have a significantly greater time interval from the considered position fix $p_i$ than the position fixes of the same run $T_n$, in which the considered position fix $p_i$ lies.

In step 12 a trajectory section $tr_1, tr_2, \ldots$, generally $tr_j$, is then formed from each sub-group, for example simply by plotting a connecting line or curve between two (or more) successive position fixes $p_i$ of the particular sub-group.

As a result, a set $\{tr_j\}$ of trajectory sections $tr_1, tr_2, \ldots$ generally $tr_j$, in the region B around the considered position fix $p_i$ is thus obtained in step 12.

In the subsequent sub-step 13, attributes for the considered position fix $p_i$ are extracted from the set $\{tr_j\}$ of trajectory sections $tr_j$ and are combined to form an attribute vector $M_i$. The attribute vector $M_i$ of the position fix $p_i$ can contain here in particular one or more of the following values:

an angle $\alpha_i$ between an arbitrary first trajectory section $tr_1$ in the region B and an arbitrary second trajectory section $tr_2$ in the region B, in particular between the trajectory section $tr_2$ containing the position fix $p_i$ and an adjacent trajectory section $tr_j$;

a normal distance $d_i$ of the considered position fix $p_i$ from the closest trajectory section $tr_j$;

a speed $v_i$, determined for example from two successive position fixes $p_i, p_{i+1}$, and associated timestamps $t_i, t_{i+1}$;

a density or density distribution of the position fixes of the group $G_i$ in the region B.

In a subsequent step 14 it is now checked whether the attribute vector $M_i$ of the considered position fix $p_i$ satisfies a predefined threshold criterion K ("y") or not ("n"). The threshold criterion K here comprises—in accordance with the particular content of the attribute vector $M_i$—one or more of the following sub-criteria:

a maximum angle $\alpha_{max}$, below which the angle $\alpha_i$ must lie so that the threshold criterion K is satisfied; the maximum angle $\alpha_{max}$ stands here for a minimum measure of parallelism that two adjacent trajectory sections $tr_j$ in the region B must have;

a maximum distance $d_{max}$, below which the normal distance $d_i$ must lie so that the threshold criterion K is met; the maximum distance $d_{max}$ stands here for an expected maximum working width b of the vehicle 1;

a maximum speed $v_{max}$, below which the speed $v_i$ must lie so that the threshold criterion K is satisfied; this is based on the assumption that work is performed on the field 2 at a slower speed than the travel to and from the field on the road network 3;

a minimum or maximum point density or point density distribution which the position fixes of the group $G_i$ must have so that the threshold criterion K is satisfied.

In the simplest case the attribute vector $M_i$ comprises only the angle $\alpha_i$ and the threshold criterion K comprises only the maximum angle $\alpha_{max}$; in a more complex embodiment the attribute vector $M_i$ comprises the aforesaid attributes to an increasingly greater extent and the threshold criterion K comprises the aforesaid sub-criteria to an increasingly greater extent, accordingly.

If the attribute vector $M_i$ in step 14 satisfies the threshold criterion K (branch "y"), the position fix $p_i$ in step 15 is then detected as a location of field work "F". Otherwise, the position fix $p_i$ is detected as a location of road travel "S" (step 16).

In the case of detected field work ("F"), this can be classified in an optional step 17, i.e. depending on the type of field work a distinction can be made between for example ploughing, harrowing, tilling, fertilising, cutting, harvesting, etc. To this end, the attribute vector $M_i$ is further evaluated, for example on the basis of the normal distance $d_i$ contained therein and/or the speed $v_i$. If, for example, the working width b of a plough of the vehicle 1 and the working speed thereof are known, the field work "ploughing" can be identified on the basis of a matching normal distance $d_i$ (within predefined tolerances) and a matching speed $v_i$ (within predefined tolerances).

Once the loop 10 has been executed with the sub-steps 11-17, a detection result will have been attained for each position fix $p_i$ in the sequence FG or trajectory TR, said result determining whether or not this position fix $p_i$ is a location of field work F. In step 18 a plurality of locally contiguous adjacent position fixes p referred to hereinafter as $p_{i,F}$, detected as a location of field work F are identified as a contiguous field A (here: the field 2). It goes without saying that a plurality of fields A separate from one another can also be identified from an overall trajectory TR of the vehicle 1, when this vehicle for example works a number of fields 2 in succession.

As soon as a field A has been determined in step 18, a contour C of the field A enveloping the position fixes $\{p_{i,F}\}$ of the field A can then be determined in a step 19. To this end, any known outline or contour search algorithms are suitable, such as a weighted minimal path search according to Edsger W. Dijkstra, "A note on two problems in connexion with graphs", Numerical Mathematics, 1, 1959, p. 269-271; or the calculation of a concave envelope by means of Alpha shapes according to N. Akkiraju, H. Edelsbrunner, M. Facello, P. Fu, E. P. Mucke, and C. Varela, "Alpha shapes: definition and software", Proc. Internat. Comput. Geom. Software Workshop 1995, Minneapolis; or a neighbour search by means of KD-Tree FLANN according to Marius Muja and David G. Lowe, "Scalable Nearest Neighbor Algorithms for High Dimensional Data", Pattern Analysis and Machine Intelligence (PAMI), volume 36, 2014.

With the aid of the contour C of the field A determined in step 19, the area of the field A can then be calculated in step 20. In a subsequent step 21, which is possible alternatively or additionally to step 17, the total field work performed in the field A can be classified, for example on the basis of a mean value of the normal distances $d_i$ and/or a mean value of the speeds $v_i$ of the attribute vectors $M_i$ of all position fixes $p_{i,F}$ of the field A. The mean value of the normal distances $d_i$ can also be used here as a measurement value of the working width b of the vehicle 1.

An optional method variant for determining the contour C of the field A with improved accuracy is shown in FIG. 2 by way of dashed lines and will be described hereinafter with simultaneous reference to FIGS. 4a to 4c.

Figure 4A:
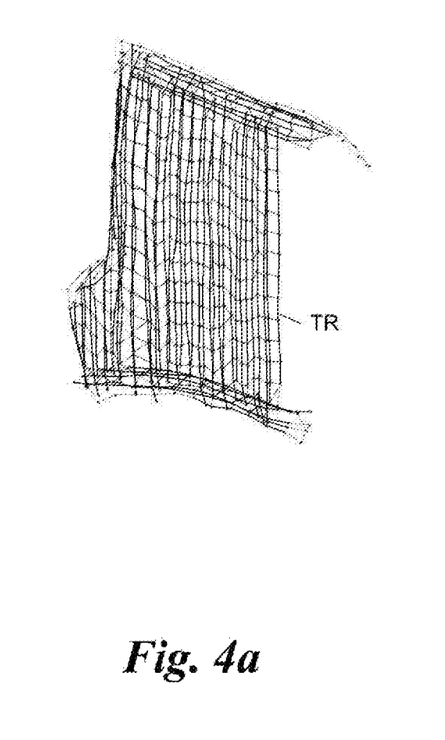
FIGS. 4a to 4c show exemplary trajectories and field contours in a plan view in various phases of the method of the disclosed subject matter.
Figure 4B:
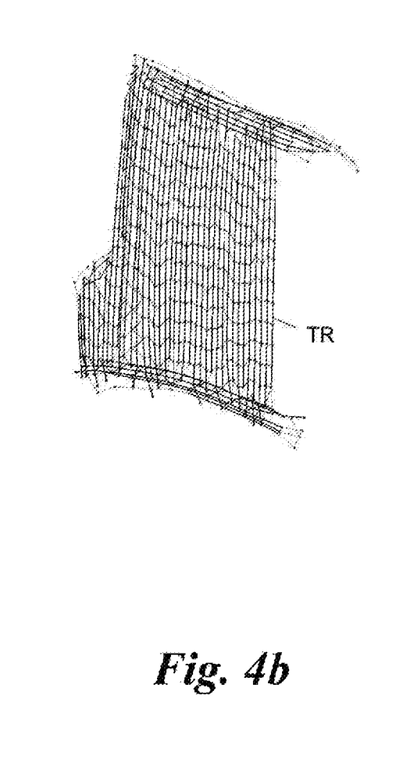
Figure 4C:
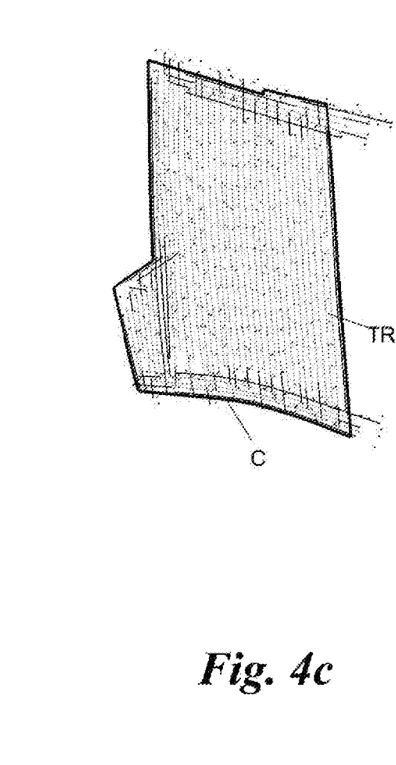

FIG. 4a shows an exemplary trajectory TR of position fixes $p_i$ in a grid view, wherein, of the position fixes $p_{i,F}$ in the field A, not only were the successive position fixes $p_{i,F}$ associated with grid lines, but also the position fixes $p_{i,F}$ lying in adjacent runs $T_n$ or trajectory sections $tr_j$.

In a first step 22, the position fixes $p_{i,F}$ in the field A are divided into chronologically successive runs $T_n$ of alternating direction of travel $R_1$, $R_2$. Optionally, turning points or turning regions between the runs $T_n$ can be detected and divided accordingly among the runs $T_n$. Then, in step 23, the position fixes $p_i$ are smoothed so as to maximise the parallelism of the runs $T_n$, i.e. are each position-shifted individually with minimisation of an error measure $e_i$, such that the runs $T_n$ are arranged adjacently in parallel to the greatest possible extent with normal distances $d_i$ that are the same to the greatest possible extent.

The smoothing step 23 can be performed for example by application of a Levenberg-Marquardt (LM) method according to Jorge J. Moré, "The Levenberg-Marquardt algorithm: Implementation and theory", in G. A. Watson (ed.) "Numerical Analysis", Dundee 1977, Lecture Notes Math. 630, 1978, p. 105-116. For each position fix $p_i$ to be corrected, a parameter point P that is to be optimised is added. The working width b and an offset $d_o$ relative to the centre line of the vehicle 1 are used as further parameters. The system that is to be optimised thus consists of the following equations (for better readability, the indices for points and vectors in the equation system have been omitted):

$$P_0 = P + d_o$$

$$e_P = \|P_0 - p\|$$

$$e_s = w_s(\|r \times (P_n - P)\|)$$

$$e_n = w_n(\|r \times (P_1 - P)\| - b)$$

$P_0$ is here the point P, r is the direction vector belonging to the point P corrected by the offset, $P_n$, is the point following in the trajectory TR, $P_1$ is the closest point in the parallel trajectory section, and $w_s$ and $w_n$ are weighting factors. The errors $e_p$, $e_s$ and $e_n$ form the error functional to be minimised $$\min \sum_A (e_p + e_s + e_n)^2$$

During the course of this optimisation, the position fixes $p_{i,F}$ are thus smoothed, corrected by an offset $d_o$ relative to the vehicle centre, and the working width b is estimated. FIG. 4b shows the result. The result of the optimisation correction in step 23 is at the same time an optimally calculated working width b in the field A (step 24).

It goes without saying that the optimisation of the step 23 can also be carried out already at the start at all position fixes $p_i$ in the sequence FG, before these are examined in the loop 10 for field work, i.e. step 23 can alternatively or additionally be performed also directly after the step 9.

With the aid of the optimally calculated working width b, the contour C of the field A, as was determined for example with the aid of the aforementioned Dijkstra, Alpha shape, or Kd-tree methods, lastly is corrected in step 25. Here, the contour C is increased by a proportion of the working width b, which takes into account the fact that the satellite navigation receiver 4 lies within the working width b of the vehicle 1, usually in the vehicle centre. If the satellite navigation receiver 4 lies in the vehicle centre, the contour C is then increased over its entire scope by b/2; if the satellite navigation receiver 4 lies for example at a distance of b/3 from the right-hand working edge of the vehicle 1 (as considered in the direction of travel), the contour C is then increased by b/3 at those peripheral locations where the vehicle 1 moves along the contour C in an anticlockwise direction, and is increased by 2b/3 at those peripheral locations where the vehicle moves along the contour C in a clockwise direction. When correcting the contour, turning points between the runs $T_n$ can also be detected and taken into consideration, optionally.

By means of the smoothing of the position fixes $p_i$ in respect of maximum parallelism of the runs $T_n$ and a normal distance $d_i$ that is as uniform as possible over the trajectory TR in the field A, an improvement of the position determination is achieved, which makes it possible to perform accurate field measurements with the aid of a simple commercially available satellite navigation receiver, without the need for precision position determination systems, such as dGPS (differential GPS) or RTK (Real Time Kinematics).

The disclosed subject matter, accordingly, is not limited to the presented embodiments, but comprises all variants, modifications and combinations thereof that fall within the scope of the accompanying claims.

What is claimed is:

1. A method for detecting agricultural field work performed by a vehicle, comprising:
    a) carrying a satellite navigation receiver on the vehicle and recording a sequence of position fixes and associated time stamps of the satellite navigation receiver;
    b) for a position fix of the sequence: determining a group of position fixes that lie in a predefined local region around the considered position fix;
    c) dividing the group into at least two sub-groups, of which position fixes of the first sub-group have a minimum time interval from position fixes of the second sub-group;
    d) determining a first trajectory section on the basis of at least two position fixes of the first sub-group and a second trajectory section on the basis of at least two position fixes of the second sub-group;
    e) determining an attribute vector for the considered position fix comprising at least an angle between the first and the second trajectory section; and,
    f) if the attribute vector satisfies a specified threshold criterion comprising a maximum angle, detecting the position fix as a location of field work.

2. The method according to claim 1, wherein the considered position fix is part of the first sub-group, the attribute vector comprises a normal distance of the considered position fix from the closest second trajectory section, and the threshold criterion also comprises a maximum distance.

3. The method according to claim 2, further comprising the classification of the detected field work on the basis of at least the normal distance.

4. The method according to claim 1, wherein the considered position fix is part of the first sub-group, the attribute vector comprises a speed determined from at least two position fixes and associated timestamps of the first sub-group, and the threshold criterion also comprises a maximum speed.

5. The method according to claim 4, further comprising the classification of the detected field work on the basis of at least the normal distance and the speed.

6. The method according to claim 1, comprising:
carrying out steps b) to f) for each position fix of the sequence; and
identifying a number of locally contiguous adjacent position fixes, each detected as the location of field work, as agriculturally worked field.

7. The method according to claim 6, further comprising the calculation of the area of the identified field.

8. The method according to claim 6, wherein the considered position fix is part of the first sub-group, the attribute vector comprises a normal distance of the considered position fix from the closest second trajectory section, and the threshold criterion also comprises a maximum distance, and further, wherein a working width of the vehicle is averaged from a number of normal distances.

9. The method according to claim 6, further comprising:
dividing the position fixes in the field into chronologically successive runs of alternating direction of travel;
smoothing the position fixes in the field so as to maximise the parallelism of the journeys; and
determining a working width from the mutual distance between at least two journeys.

10. The method according to claim 8, further comprising:
determining a contour of the field;
increasing the contour of the field by a proportion of the working width; and
calculating the area within the increased contour as the area of the identified field.

11. The method according to claim 8, further comprising the classification of the field at least on the basis of the determined working width.

12. The method according to claim 1, wherein step a) is performed with a mobile terminal and steps b) to f) are performed in a remote server, which obtains the sequence from the terminal via a mobile communication connection.

* * * * *